(12) United States Patent
Huo et al.

(10) Patent No.: US 12,470,719 B2
(45) Date of Patent: Nov. 11, 2025

(54) METHOD FOR DETERMINING PREDICTION DIRECTION, DECODER, AND COMPUTER STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Yanzhuo Ma, Guangdong (CN); Jianglin Wang, Guangdong (CN); Shuai Wan, Guangdong (CN); Fuzheng Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/762,640

(22) Filed: Jul. 3, 2024

(65) Prior Publication Data
US 2024/0357124 A1    Oct. 24, 2024

Related U.S. Application Data

(63) Continuation of application No. 18/131,065, filed on Apr. 5, 2023, now Pat. No. 12,069,276, which is a
(Continued)

(51) Int. Cl.
*H04N 19/137*    (2014.01)
*H04N 19/159*    (2014.01)
(Continued)

(52) U.S. Cl.
CPC ......... *H04N 19/137* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | |
|---|---|---|---|
| 11,582,482 B2 * | 2/2023 | Choi | .......... H04N 19/176 |
| 2013/0114696 A1 | 5/2013 | Liu | |

(Continued)

FOREIGN PATENT DOCUMENTS

| | | |
|---|---|---|
| CN | 104093025 A | 10/2014 |
| CN | 104247422 A | 12/2014 |

(Continued)

OTHER PUBLICATIONS

First Office Action of the Korean application No. 10-2021-7024202, issued on Aug. 30, 2024, 9 pages with English translation.
(Continued)

*Primary Examiner* — Marnie A Matt
(74) *Attorney, Agent, or Firm* — Ladas & Parry, LLP

(57) ABSTRACT

Provided are a method for determining a prediction direction, a decoder and a computer storage medium. The method is implemented by a decoder. The method includes that: a Direct Mode (DM) in a chroma intra prediction mode of a block to be decoded is acquired (S101); and an index number of a prediction direction in a DM derived mode is determined based on an offset N and an index number M of a prediction direction in the DM to determine the DM derived mode (S102).

4 Claims, 6 Drawing Sheets

Related U.S. Application Data continuation of application No. 17/714,881, filed on Apr. 6, 2022, now Pat. No. 11,659,187, which is a continuation of application No. 17/366,787, filed on Jul. 2, 2021, now Pat. No. 11,343,508, which is a continuation of application No. PCT/CN2019/070145, filed on Jan. 2, 2019.

(51) Int. Cl.
*H04N 19/176* (2014.01)
*H04N 19/186* (2014.01)

(56) References Cited

U.S. PATENT DOCUMENTS

| | | | |
|---|---|---|---|
| 2014/0086323 A1 | 3/2014 | Chuang | |
| 2014/0140404 A1 | 5/2014 | Liu | |
| 2016/0142706 A1 | 5/2016 | Chuang | |
| 2017/0366818 A1 | 12/2017 | Zhang | |
| 2018/0048889 A1 | 2/2018 | Zhang | |
| 2018/0063553 A1 | 3/2018 | Zhang | |
| 2018/0103252 A1 | 4/2018 | Hsieh | |
| 2018/0205946 A1 | 7/2018 | Zhang | |
| 2019/0007705 A1 | 1/2019 | Zhao | |
| 2019/0166370 A1* | 5/2019 | Xiu | H04N 19/176 |
| 2020/0260096 A1 | 8/2020 | Ikai | |
| 2020/0288135 A1 | 9/2020 | Laroche | |
| 2021/0136395 A1 | 5/2021 | Jun | |
| 2021/0218992 A1 | 7/2021 | Jeon | |
| 2022/0021902 A1* | 1/2022 | Choi | H04N 19/105 |
| 2023/0319289 A1* | 10/2023 | Xiu | H04N 19/11 375/240.03 |
| 2025/0039402 A1* | 1/2025 | Xiu | H04N 19/176 |

FOREIGN PATENT DOCUMENTS

| | | |
|---|---|---|
| CN | 107257456 A | 10/2017 |
| CN | 108540811 A | 9/2018 |
| CN | 108810551 A | 11/2018 |
| JP | 2016511975 A | 4/2016 |
| JP | 2018078409 A | 5/2018 |
| WO | 2015196126 A1 | 12/2015 |
| WO | 2017192995 A1 | 11/2017 |
| WO | 2018035130 A1 | 2/2018 |

OTHER PUBLICATIONS

First Office Action of the Indonesian patent application No. P00202105972, issued on Jan. 2, 2025.
International Search Report in the international application No. PCT/CN2019/070145, mailed on Oct. 8, 2019.
Joint Video Experts Team (JVET) of ITU-T SG 16 WP 3 and ISO/IEC JTC 1/SC 29/WG 11. 12th Meeting: Macao, CN, Oct. 3-12, 2018, Document: JVET-L0035-v4; Title: CE15: Summary report of Core Experiment on palette mode.
Joint Video Exploration Team (JVET) of ITU-T SG 16 WP 3 and ISO/IEC JTC 1/SC 29/WG 11, 12th Meeting: Macao, CN, Oct. 3-12, 2018, Document: JVET-L0630-v2; Title: CE3-related: Simplification of MDMS derivation.
3GPP TS 38.331 V16.4.1 (Mar. 2021),Technical Specification,3rd Generation Partnership Project; Technical Specification Group Radio Access Network;NR;Radio Resource Control (RRC) protocol specification (Release 16).
3GPP TS 38.133 V16.8.0 (Jun. 2021), Technical Specification, 3rd Generation Partnership Project; Technical Specification Group Radio Access Network;NR;Requirements for support of radio resource management (Release 16).
Written Opinion of the International Search Authority in the international application No. PCT/CN2019/070145, mailed on Oct. 8, 2019.
Zhang (Qualcomm) L et al: "Multiple Direct Modes for chroma intra coding", 4. JVET Meeting; Oct. 15, 2016-Oct. 21, 2016; Chengdu; (The Joint Video Exploration Team of ISO/IEC JTC1/SC29/WG11 and ITU-T SG.16), No. JVET-D0111, Oct. 17, 2016 (Oct. 17, 2016).
Bross B et al: "Versatile Video Coding(Draft 3)", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L1001, Dec. 14, 2018 (Dec. 14, 2018).
Supplementary European Search Report in the European application No. 19907745.4, mailed on Dec. 3, 2021.
Office Action of the Indian application No. 202127030755, issued on Mar. 11, 2022.
First Office Action of the U.S. Appl. No. 17/366,787, issued on Oct. 26, 2021.
Notice of Allowance of the U.S. Appl. No. 17/366,787, issued on Jan. 26, 2022.
Corrected Notice of Allowance of the U.S. Appl. No. 17/366,787, issued on Mar. 4, 2022.
Li Zhang et al., "Multiple Direct Mode for Intra Coding", IEEE 2017 IEEE Visual Communications and Image Processing (VCIP)—St. Petersburg, FL (Dec. 10, 2017-Dec. 13, 2017).
First Office Action of the Chinese application No. 202110635959.2, issued on Apr. 6, 2022.
Corrected Notice of Allowance of the U.S. Appl. No. 17/366,787, issued on Apr. 20, 2022.
Corrected Notice of Allowance of the U.S. Appl. No. 17/366,787, issued on Apr. 22, 2022.
First Office Action of the European application No. 19907745.4, issued on Aug. 17, 2022.
Notice of oral proceedings of the European application No. 19907745.4, issued on Jan. 31, 2023.
Gagan Rath, et al., "CE3-related: DM-dependent chroma intra prediction modes", Joint Video Experts Team (JVET) of ITU-T SG 16 WP 3 and ISO/IEC JTC 1/SC 29/WG 11 13th Meeting: Marrakech, MA, Jan. 9-18, 2019, JVET-M0100.
First Office Action of the Japanese application No. 2021-538790, issued on Feb. 28, 2023.
K. Zhang, J. Chen, L. Zhang, X. Li and M. Karczewicz, "Enhanced Cross-Component Linear Model for Chroma Intra-Prediction in Video Coding", in IEEE Transactions on Image Processing, vol. 27, No. 8, pp. 3983-3997, Aug. 2018, doi: 10.1109/TIP.2018.2830640.
T. Laude, Y. G. Adhisantoso, J. Voges, M. Munderloh and J. Ostermann, "A Comparison of JEM and AV1 with HEVC: Coding Tools, Coding Efficiency and Complexity", 2018 Picture Coding Symposium (PCS), 2018, pp. 36-40, doi: 10.1109/PCS.2018.8456291.
Notice of Allowance of the U.S. Appl. No. 17/714,881, issued on Jan. 20, 2023.
European Search Report in the European application No. 24175482.9, mailed on Jun. 12, 2024.
Hearing Notice of the Indian application No. 202127030755, issued on Apr. 4, 2024, 3 pages with English translation.
First Office Action of the U.S. Appl. No. 18/131,065, issued on Feb. 8, 2024.
Notice of Allowance of the U.S. Appl. No. 18/131,065, issued on May 10, 2024.
First Office Action of the corresponding Chinese application No. 202211246636.5, issued on May 30, 2025 with search report.

* cited by examiner

METHOD FOR DETERMINING PREDICTION DIRECTION, DECODER, AND COMPUTER STORAGE MEDIUM

CROSS-REFERENCE TO RELATED APPLICATIONS

This application is a continuation of U.S. patent application Ser. No. 18/131,065 filed on Apr. 5, 2023, which is a continuation of U.S. patent application Ser. No. 17/714,881 filed on Apr. 6, 2022, which is a continuation of U.S. patent application Ser. No. 17/366,787 filed on Jul. 2, 2021, which is a continuation of International Patent Application No. PCT/CN2019/070145 filed on Jan. 2, 2019, the disclosure of which are incorporated herein by reference in their entireties.

TECHNICAL FIELD

Embodiments of the disclosure relate to the technical field of determination of a prediction direction in a Direct Mode (DM) in video decoding, and particularly to a method for determining a prediction direction, a decoder and a computer storage medium.

BACKGROUND

In Versatile Video Coding (VVC), candidate modes of a chroma intra prediction mode may include a DM, a Linear Model Prediction (LM) mode, an LM_Top (LM_T) mode, an LM_Left (LM_L) mode, a Direct Current (DC) mode, a PLANAR mode, a Vertical (VER) mode and a Horizontal (HOR) mode.

At present, a candidate list of a chroma intra prediction mode in VVC may also be constructed by Multiple Direct Mode Signaling (MDMS). 17 candidates are required to be compared. The comparison count is large, dependence on a neighbouring block is relatively high, and the complexity in decoding is relatively high. In addition, in construction of the candidate list of the chroma intra prediction mode in VVC, when a DM is an angular mode, a fixed HOR mode, VER mode and 66 mode may be adopted for a default candidate angular mode. However, there is a high sequence dependence for the three fixed modes, and a conforming angular feature is usually represented by the DM, so the three modes are unlikely to be selected during practical applications. Moreover, only a local texture feature of a chroma block may be reflected in a present DM. When a chroma block corresponds to multiple collocated luma blocks, it is unreasonable to directly use the DM only for prediction. It can thus be seen that an existing candidate mode of a chroma intra prediction mode has prediction inaccuracy during decoding.

SUMMARY

In view of this, the embodiments of the disclosure are intended to provide a method for determining a prediction direction, a decoder and a non-transitory computer storage medium, which may improve the chroma intra prediction accuracy of the decoder.

According to a first aspect, a method for determining a prediction direction is provided. The method may be implemented by a decoder and include: determining a chroma intra prediction mode of a block to be decoded; acquiring a Direct Mode (DM); and determining an index number of a prediction direction in a DM derived mode based on an offset N and an index number M of a prediction direction in the DM to determine the DM derived mode, N being a positive integer and M being a positive integer.

According to a second aspect, a method for determining a prediction direction is provided. The method may be implemented by an encoder and include: determining a chroma intra prediction mode of an encoding block; acquiring a Direct Mode (DM); and determining an index number of a prediction direction in a DM derived mode based on an offset N and an index number M of a prediction direction in the DM to determine the DM derived mode, N being a positive integer and M being a positive integer.

According to a third aspect, a decoder is provided. The decoder includes a processor and a storage medium storing instructions executable by the processor. The storage medium may communicate with the processor through a communication bus to execute an operation. The instructions may be executed by the processor to implement the method for determining a prediction direction as described in the first aspect.

According to a fourth aspect, an encoder is provided. The encoder includes a processor and a storage medium storing instructions executable by the processor. The storage medium may communicate with the processor through a communication bus to execute an operation. The instructions may be executed by the processor to implement the method for determining a prediction direction as described in the second aspect.

According to a fifth aspect, a non-transitory computer storage medium is provided. The non-transitory computer storage medium may store executable instructions. The readable instructions may be executed by one or more processors to enable the one or more processors to implement the method for determining a prediction direction as described in the first aspect or the method for determining a prediction direction as described in the second aspect.

DETAILED DESCRIPTION

In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

Figure 1:
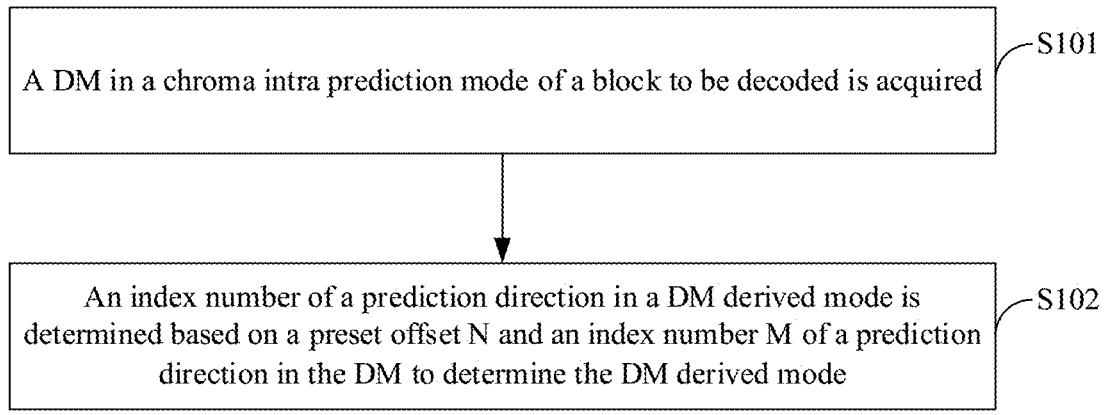
FIG. 1 is a flowchart of a method for determining a prediction direction according to an embodiment of the disclosure.

The embodiments of the disclosure provide a method for determining a prediction direction. The method is implemented by a decoder. FIG. 1 is a flowchart of a method for determining a prediction direction according to an embodiment of the disclosure. Referring to FIG. 1, the method for determining a prediction direction may include the following operations.

In S101, a DM in a chroma intra prediction mode of a block to be decoded is acquired.

With the rapid development of electronic devices, video coding and decoding technologies have also been developed rapidly. Specifically, in video coding and decoding, a prediction value of a present processing block may be created based on a reconstructed image existing in space or time and only a difference value between a true value and the prediction value is transmitted, to reduce a transmitted data volume. This is called predictive coding and decoding.

Figure 2:
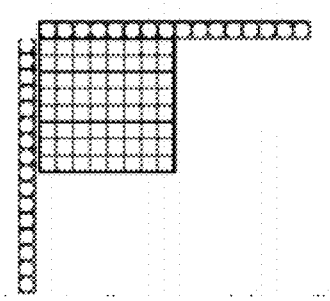
FIG. 2 is an arrangement diagram of a present processing block.

FIG. 2 is an arrangement diagram of a present processing block. As shown in FIG. 2, the largest square formed by a plurality of small squares in FIG. 2 is the present processing block, circles in a row at the top of the present processing block are top-row pixels of the present processing block, and circles in a column on the left of the present processing block are left-column pixels of the present processing block. Intra prediction refers to creating prediction values of the present processing block by use of the top-row pixels and left-column pixels of the present processing block. Referring to FIG. 2, each pixel of the present processing block is predicted by use of the circles in FIG. 2, i.e., neighbouring pixels that have been recovered.

Figure 3A:
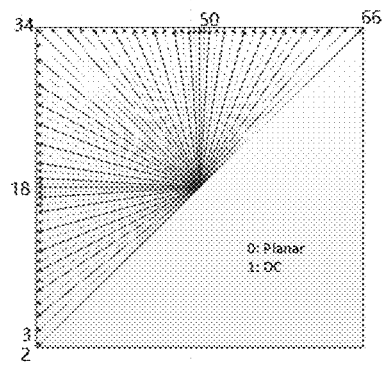
FIG. 3A is an arrangement diagram of prediction directions.
Figure 3B:
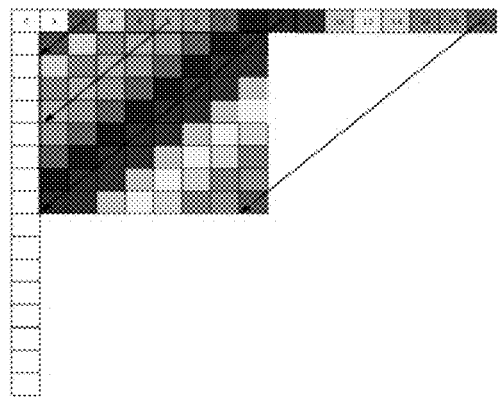
FIG. 3B is an arrangement diagram filled with prediction values.

When the prediction values of the present processing block are created by use of the neighbouring pixels, multiple prediction directions are adopted. FIG. 3A-FIG. 3B are respectively an arrangement diagram of prediction directions and an arrangement diagram filled with prediction values. As shown in FIG. 3A, 67 luma prediction modes presently supported by VVC are shown. With introduction of a DM and the like, these intra prediction modes may also be adopted for a chroma block. Each prediction mode is represented by an index number. A value represented by the DM may be correlated with an angle or may be uncorrelated with an angle. For example, when the DM is correlated with an angle, index number 0 represents a PLANAR mode, and index number 1 represents a DC mode. When the DM is an angular mode, index numbers 2 to 66 represent 65 prediction directions.

It is to be noted that the DC mode and the PLANAR mode are two relatively flat structured prediction modes. In the DC mode, the whole luma or chroma block may be filled with an average value of reference pixels in a top row and a left column. In the PLANAR mode, the luma or chroma block may be filled in a gradient manner.

FIG. 3B is an arrangement diagram filled with created prediction values of pixels. For a condition that the DM is the angular mode, when an index number of a prediction direction is, for example, 66, a method for creating a prediction value of each pixel is provided. The pixels labeled with 0 to 16 are top-row data of the present processing block, each pixel of the present processing block is filled based on the pixel in the right upper corner, and the present processing block subjected to filling is shown in FIG. 3B.

When the DM is the angular mode, the index numbers 2 to 66 represent that the 65 prediction directions also include two special direction modes. For example, index number 18 represents a HOR mode, index number 50 represents a VER mode. In the two modes, horizontal prediction and vertical prediction may be performed respectively.

Figure 4A:
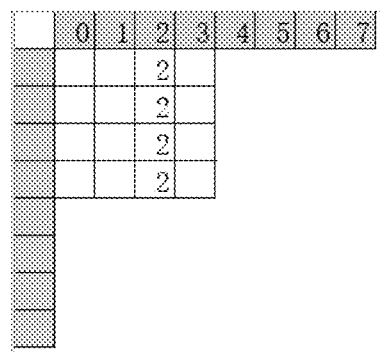
FIG. 4A is an arrangement diagram of prediction in a VER mode.
Figure 4B:
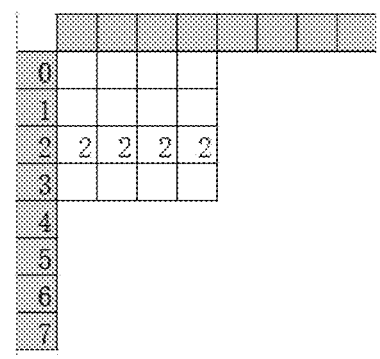
FIG. 4B an arrangement diagram of prediction in a HOR mode.

FIG. 4A and FIG. 4B are respectively an arrangement diagram of prediction in a VER mode and an arrangement diagram of prediction in a HOR mode. As shown in FIG. 4A, top-row pixels are represented by 0, 1, 2, 3, 4, 5, 6, 7 respectively. Prediction in the VER mode is performed by use of the top-row pixels. As shown in FIG. 4A, the column is filled with the top-row pixels. As shown in FIG. 4B, the row is filled with left-column pixels.

During a practical application, for a luma mode, prediction may be performed sequentially based on the prediction directions 0 to 66 in FIG. 3A, the prediction direction matched with the present processing block best (or corresponding to a minimum rate distortion cost difference value) may be selected to create prediction values, a coder may write a difference value and a prediction direction into a code stream, a decoder may acquire and parse the code stream to obtain an index number of the prediction direction and then may calculate a predicted luma value, and the predicted luma value may be added with a difference signal obtained by parsing the code stream to obtain a reconstructed luma value.

For chroma intra prediction, unlike the luma prediction modes, only part of prediction directions are extracted for chroma intra prediction directions, so that the complexity may be reduced. For example, a construction method for a candidate list of chroma intra prediction modes in VVC is shown in Table 1.

TABLE 1

Figure 5:
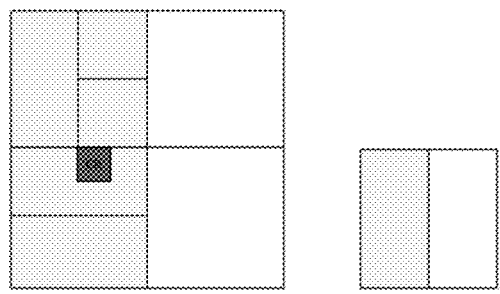
FIG. 5 is an arrangement diagram of luma blocks corresponding to a present processing block.

| Sequence number | Name | Description |
| --- | --- | --- |
| 1 | DM | See the prediction mode corresponding to the central luma block in FIG. 5 |
| 2 | CCLM CCLM_L CCLM_T | A predicted signal is constructed based on a solution of a*luma value + b, and a and b are calculated in CCLM based on the top row and the left column<br>a and b are calculated in CCLM_L based on the left column<br>a and b are calculated in CCLM_T based on the top row |
| 3 | DC | The index number of the intra direction in FIG. 3A is 1, and when the DM is the DC mode, the index number is changed to 66 |
| 4 | PLANAR | The index number of the intra direction in FIG. 3A is 0, and when the DM is the PLANAR mode, the index number is |

TABLE 1-continued

| Sequence number | Name | Description |
|---|---|---|
| | | changed to 66 |
| 5 | VER | The index number of the intra direction in FIG. 3A is 50, and when the DM is the VER mode, the index number is changed to 66 |
| 6 | HOR | The index number of the intra direction in FIG. 3A is 18, and when the DM is the HOR mode, the index number is changed to 66 |

FIG. 5 is an arrangement diagram of luma blocks corresponding to a present processing block. As shown in FIG. 5, the gray blocks on the left side are luma block corresponding to a present chroma block, and the gray block on the right side is the present chroma block. When intra prediction is performed on the present chroma block, a prediction direction in a central block of the luma blocks is utilized, the central block being a luma block represented by CR in the gray blocks on the left side in FIG. 5.

It can be seen from Table 1 that, when the prediction direction obtained for the DM is the same as the last four modes, the last four modes may be replaced with the mode with the index number of the prediction direction being 66.

In addition to the abovementioned construction method, there is another method, i.e., an MDMS mode. It is a more complex construction method for a candidate list of a chroma intra prediction mode. Compared with VVC, the method is 0.2% lower in code rate but excessively high in complexity. The another construction method is shown in Table 2.

TABLE 2

Figure 6A:
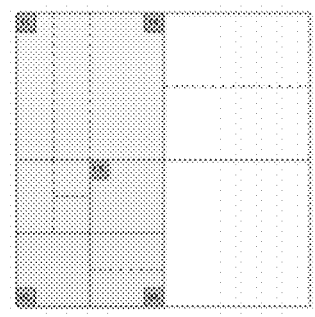
FIG. 6A is a diagram of arrangement of chroma blocks adopted in a DM in Table 2 respectively.
Figure 6B:
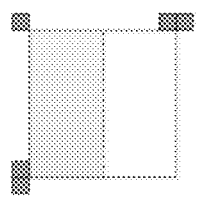
FIG. 6B is a diagram of arrangement of chroma blocks adopted in a chroma neighbouring block mode in Table 2 respectively.

| Sequence number | Name | Description |
|---|---|---|
| 1 | CCLM | A predicted signal is constructed based on a solution of a*luma value + b |
| 5 prediction modes are selected in order | DM | Intra prediction mode of corresponding luma blocks at five positions, i.e., the center, the top-left, the top-right, the bottom-left and the bottom-right of a present chroma block, i.e., the orange block in FIG. 6A |
| | Chroma neighbouring block | Intra prediction mode of a chroma block spatially neighboring to the left, top-left, bottom-left, top and top-right blocks, i.e., the green block in FIG. 6B |
| | DC | The index number of the intra direction in FIG. 3A is 1 |
| | PLANAR | The index number of the intra direction in FIG. 3A is 0 |
| | Fine adjustment 13 of the existing angular mode | Mode derived by adding 1 to or subtracting 1 from the existing angular mode |
| | Default mode | VER (18), HOR (50), 2, 34, 66, 10, 26 |

FIG. 6 is a diagram of arrangement of chroma blocks adopted in a DM and a chroma neighbouring block mode in Table 2 respectively. As shown by small squares in FIG. 6A, the DM in Table 2 is an intra prediction mode that the adopted present chroma block corresponds to five positions, i.e., the center CR, the top-left TL, the top-right TL, the bottom-left BL and the bottom-right BR, of a luma block region. As shown by small squares in FIG. 6B, the chroma neighbouring block mode in Table 2 is an intra prediction mode that an adopted chroma block is spatially neighboring to left, top-left, bottom-left, top and top-right blocks.

Figure 7:
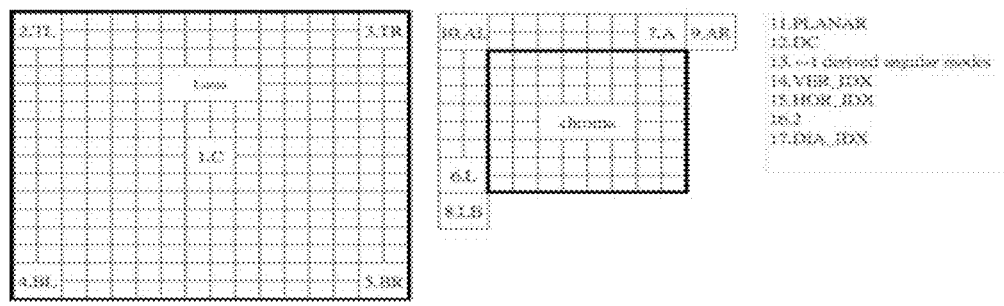
FIG. 7 is a schematic diagram of a traversing sequence of intra prediction directions in MDMS.

FIG. 7 is a schematic diagram of a traversing sequence of intra prediction directions in MDMS. As shown in FIG. 7, an intra prediction sequence is: 1, the central luma block C; 2, the top-left luma block TL; 3, the top-right luma block TR; 4, the bottom-left luma block BL; 5, the bottom-right luma block BR; 6, the left chroma block L; 7, the top chroma block; 8, the bottom-left chroma block LB; 9, the top-right chroma block AR; 10, the top-left chroma block AL; 11, PLANAR; 12, DC; 13, an index number of an existing prediction direction minus 1 (equivalent to +1 derived angular modes); 14, an index number 50 of a prediction direction (equivalent to VER_IDX); 15, an index number 18 of a prediction direction (equivalent to HOR_IDX); 16, an index number 2 of a prediction direction; and 17, an index number 34 of a prediction direction (equivalent to DIA_IDX).

It can thus be seen that the construction method for a chroma intra prediction direction in VVC is simple, however, the fixed HOR, VER and 66 modes that are adopted are high in sequence dependence and cannot be adapted to all sequences very well. Subsequent statistical data shows that these modes may be selected at a lower probability.

MDMS requires 17 candidate solutions to be compared, and a gain of −0.2% may be brought. However, the comparison count is large, dependence on a neighbouring block is high, and consequently, MDMS is difficult to be implemented practically. There are some methods for reducing the complexity of MDMS, for example, deleting prediction directions 2, 3, 4 and 5 in FIG. 7 or deleting the top-right luma block AR, PLANAR, DC and adding 1 to and substracting 1 from the index number of the existing prediction direction in FIG. 7.

Figure 8:
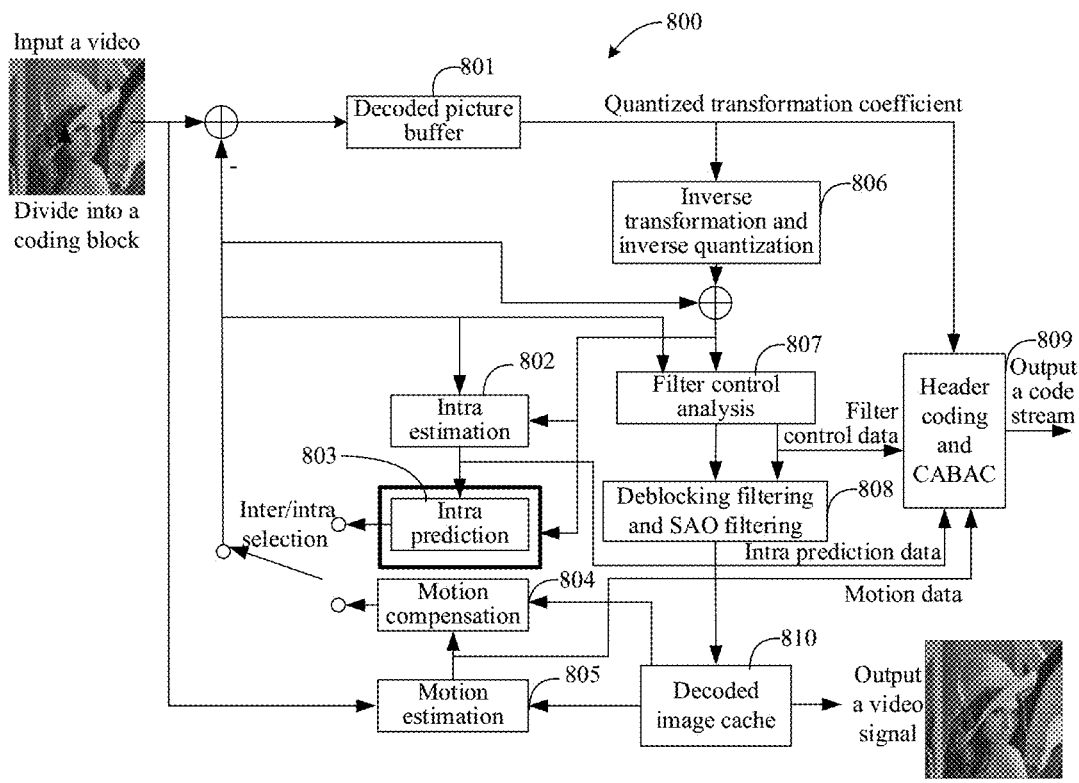
FIG. 8 is an example of composition block diagram of a video coding system according to an embodiment of the disclosure.

For improving the accuracy of a candidate prediction direction, FIG. 8 is an example of composition block diagram of a video coding system according to an embodiment of the disclosure. As shown in FIG. 8, the video coding system 800 includes components such as transformation and quantization 801, intra estimation 802, intra prediction 803, motion compensation 804, motion estimation 805, inverse transformation and inverse quantization 806, filter control analysis 807, deblocking filtering and Sample Adaptive Offset (SAO) filtering 808, header coding and Context-based Adaptive Binary Arithmetic Coding (CABAC) 809 and a decoded picture buffer 810. For an input source video signal, a video coding block may be obtained by division of a Coding Tree Unit (CTU), and then residual pixel information obtained by performing intra or inter prediction may be transformed through the transformation and quantization 801. Transformation of the video coding block by the transformation and quantization 801 may include transforming residual information from a pixel domain to a transformation domain and quantizing an obtained transformation coefficient to further reduce a bit rate. The intra estimation 802 and the intra prediction 803 are configured to perform intra prediction on the video coding block. Specifically, the intra estimation 802 and the intra prediction 803 are configured to determine an intra prediction mode to be adopted to code the video coding block. The motion compensation 804 and the motion estimation 805 are configured to execute intra prediction coding on the received video coding block relative to one or more blocks in one or more reference pictures to provide time prediction information. Motion estimation executed by the motion estimation 805 is a process of generating a motion vector. A motion of the video coding block may be estimated based on the motion vector, and then the motion compensation 804 may perform motion compensation based on the motion vector determined by the motion estimation 805. After the intra prediction mode is determined, the intra prediction 803 is further configured to provide selected intra prediction data for the header coding and CABAC 809, and the motion estimation 805 may also send motion vector data determined by calculation to the header coding and CABAC 809. The inverse transformation and inverse quantization 806 is configured to reconstruct the video coding block, namely reconstructing a residual block in the pixel domain. An artifact with a blocking effect in the reconstructed residual block may be removed through the filter control analysis 807 and the deblocking filtering and SAO filtering 808, and then the reconstructed residual block may be added to a predictive block in a picture of the decoded picture buffer 810 to generate a reconstructed video coding block. The header coding and CABAC 809 is configured to code various coding parameters and quantized transformation coefficients. In a CABAC-based coding algorithm, a context content may be configured to code information indicating the determined intra prediction mode based on adjacent coding blocks to output a code stream of the video signal. The decoded picture buffer 810 is configured to store the reconstructed video coding block as a prediction reference. As video images are coded, new reconstructed video coding blocks may be continuously generated, and these reconstructed video coding blocks may be stored in the decoded picture buffer 810.

Figure 9:
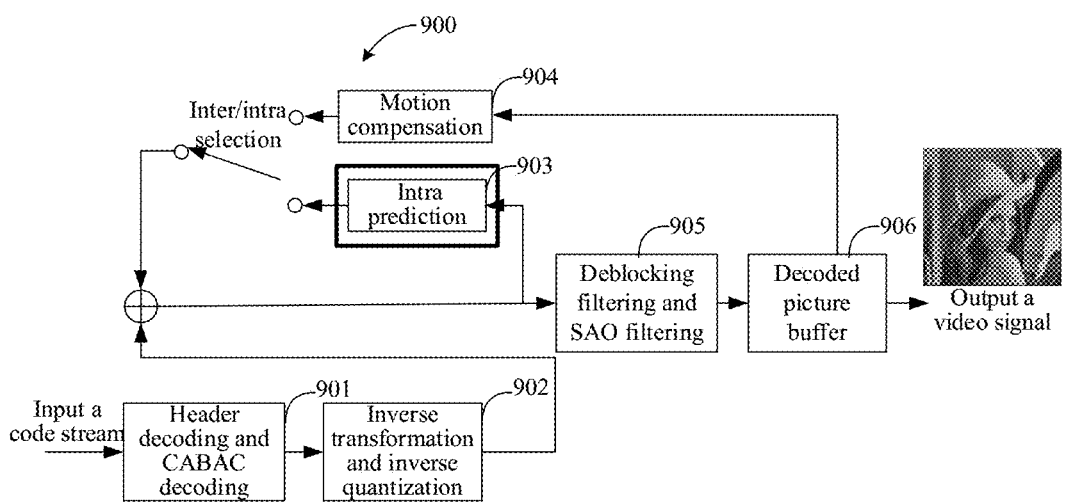
FIG. 9 is an example of composition block diagram of a video decoding system according to an embodiment of the disclosure.

FIG. 9 is an example of composition block diagram of a video decoding system according to an embodiment of the disclosure. As shown in FIG. 9, the video decoding system 900 includes components such as header decoding and CABAC decoding 901, inverse transformation and inverse quantization 902, intra prediction 903, motion compensation 904, deblocking filtering and SAO filtering 905 and a decoded picture buffer 906. After coding processing shown in FIG. 8 is performed on an input video signal, a code stream of the video signal is output. The code stream may be input to the video decoding system 900, and may be processed through the header decoding and CABAC decoding 901 at first to obtain a decoded transformation coefficient. A residual block may be generated in a pixel domain by processing of the inverse transformation and inverse quantization 902 for the transformation coefficient. The intra prediction 903 may be configured to generate prediction data of a present video decoding block based on a determined intra prediction mode and data of a previous decoded block from a present frame or picture. The motion compensation 904 may analyze a motion vector and another associated syntactic element to determine predictive information for the video decoding block and generate a predictive block of the video decoding block that is presently decoded based on the predictive information. The residual block from the inverse transformation and inverse quantization 902 and the corresponding predictive block generated by the intra prediction 903 or the motion compensation 904 may be summed to form a decoded block. An artifact with a blocking effect in the decoded block may be removed through the deblocking filtering and SAO filtering 905, thereby improving the video quality. The decoded block may be stored in the decoded picture buffer 906. The decoded picture buffer 906 may store a reference image for subsequent intra prediction or motion compensation and may be also configured to output a video signal, namely the original video signal that is recovered may be obtained.

The embodiment of the disclosure is mainly implemented by the part of the intra prediction 803 shown in FIG. 8 and the part of the intra prediction 903 shown in FIG. 9. The embodiment of the disclosure may be implemented by both the coding system and the decoding system, but no limits are made thereto in the embodiments of the disclosure.

Referring to FIG. 1 again, for obtaining a DM derived mode, a DM is acquired at first, and in such a manner, an index number of a prediction direction in the DM may be obtained.

In S102, an index number of a prediction direction in a DM derived mode is determined based on an offset N and an index number M of a prediction direction in the DM to determine the DM derived mode.

N is a positive integer larger than or equal to 2, and M is a positive integer.

Here, it is to be noted that prediction directions represented by index numbers in the DM may be the same as or different from prediction directions represented by index numbers in the block to be decoded and this is related to a shape and/or size of the block to be decoded. For example, when a width-height ratio of the block to be decoded is the same as that of a blocking shape of a reference region, all the index numbers of the prediction directions in the DM are the same as the index numbers of the prediction directions in the block to be decoded; and when the width-height ratio of the block to be decoded is different from that of the blocking shape of the reference region, prediction directions corresponding to sequence numbers under an extended mode may be different in a wide-angle mode.

During a practical application, N is usually 3, 5 or 7. Here, no specific limits are made thereto in the embodiment of the disclosure.

Figure 10:
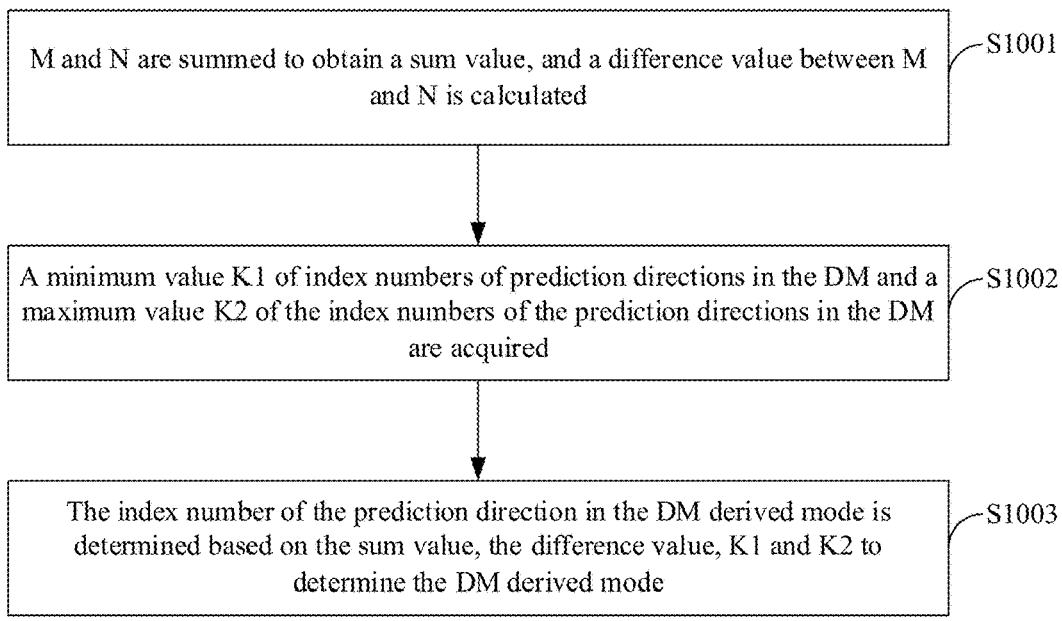
FIG. 10 is a flowchart of another method for determining a prediction direction according to an embodiment of the disclosure.

For determining an index number of a prediction direction in the DM derived mode, FIG. 10 is a flowchart of another method for determining a prediction direction according to an embodiment of the disclosure. Referring to FIG. 10, S102 may include the following operations.

In S1001, M and N are summed to obtain a sum value, and a difference value between M and N is calculated.

In S1002, a minimum value K1 of index numbers of prediction directions in the DM and a maximum value K2 of the index numbers of the prediction directions in the DM are acquired.

In S1003, the index number of the prediction direction in the DM derived mode is determined based on the sum value, the difference value, K1 and K2 to determine the DM derived mode.

That is, a sum of M and N and a difference between M and N may be calculated at first, and moreover, K1 and K2 may be acquired. Here, there are two conditions. One is that the index numbers of the prediction directions in the DM are the same as the index numbers of the prediction directions in the block to be decoded. The other is that the index numbers of the prediction directions in the DM are different from the index numbers of the prediction directions in the block to be decoded.

When the index numbers of the prediction directions in the DM are the same as the index numbers of the prediction directions in the block to be decoded, S1003 may include the following operations for determining the index number of the prediction direction in the DM derived mode in an optional embodiment.

When the sum value is smaller than or equal to K2 and the difference value is larger than or equal to K1, it may be determined that the index numbers of the prediction directions in the DM derived mode are the sum value and the difference value respectively.

When the difference value is smaller than or equal to K1, it may be determined that the index numbers of the prediction directions in the DM derived mode are the sum value and a first output value respectively, the first output value being a value obtained by inputting M and N to a first preset formula.

When the sum value is larger than or equal to K2, it may be determined that the index numbers of the prediction directions in the DM derived mode are a second output value and the difference value respectively, the second output value being a value obtained by inputting M and N to a second preset formula.

The first preset formula and the second preset formula may be obtained according to K1 and K2, and the variables M and N are preset.

For example, when the DM is an angular mode, the minimum value of the index numbers of the prediction directions in the DM is 2 and the maximum value is 66. The DM derived mode may be obtained by adding and subtracting N and performing mapping to an effective angle range. A value of N is greater than 2, recommended to be 3, 5 or 7.

For example, N is 5, and the present DM is an angular mode M ($2 \leq M \leq 66$). (Here, like adding and substracting N in an angular mode in luma intra prediction candidates), it is assumed a wide-angle mode is not considered (equivalently, the index numbers of the prediction directions in the DM are the same as the index numbers of the prediction directions in the block to be decoded), the method for determining a prediction direction is as follows.

When $M+N \leq 66$ and $M-N \geq 2$, an index number of a prediction direction in the DM derived mode is M+N and M−N.

When $M-N \leq 2$, an index number of a prediction direction in the DM derived mode is M+N and $((M+62-N) \% 64)+2$.

When $M+N \geq 66$, an index number of a prediction direction in the DM derived mode is $((M-2+N) \% 64)+2$ and M−N.

The symbol "%" represents a remainder calculation. For example, when the DM is 40 and an offset N is 5, index numbers of prediction directions in the DM derived mode are 35 and 45. When the DM is 62, the derived mode is 57 and 3 (62+5=67, 67 exceeds a range [2, 66] and may be limited back to 3 by modulus calculation, except in a wide-angle mode). When the wide-angle mode is considered, mapping may be performed based on a real angle range. Then, the construction method for a chroma intra prediction direction in the example is shown in Table 3.

TABLE 3

| Sequence number | Name | Description |
| --- | --- | --- |
| 1 | DM | See the prediction mode corresponding to the central luma block in FIG. 5 |
| 2 | CCLM CCLM_L CCLM_T | A predicted signal is constructed based on a solution of a*luma value + b, and a and b are calculated in CCLM based on the top row and the left column a and b are calculated in CCLM_L based on the left column a and b are calculated in CCLM_T based on the top row |
| 3 | DM + N | Offsetting the direction in the DM clockwise by N |
| 4 | DM − N | Offsetting the direction in the DM counter-clockwise by N |
| 5 | DC | The index number of the intra direction in FIG. 3A is 1, and when the DM is the DC mode, the index number is changed to 66 |
| 6 | PLANAR | The index number of the intra direction in FIG. 3A is 0, and when the DM is the |

TABLE 3-continued

| Sequence number | Name | Description |
| --- | --- | --- |
| | | PLANAR mode, the index number is changed to 66 |

When the index numbers of the prediction directions in the DM are the same as the index numbers of the prediction directions in the block to be decoded, S1003 may include the following operations for determining an index number of a prediction direction in the DM derived mode in an optional embodiment.

When the sum value is smaller than or equal to K2 and the difference value is larger than or equal to K1, it may be determined that index numbers of prediction directions in the DM derived mode is the sum value and the difference value respectively.

When the difference value is smaller than or equal to K1, it may be determined that index numbers of the prediction directions in the DM derived mode are the sum value and K1 respectively.

When the sum value is larger than or equal to K2, it may be determined that index numbers of prediction directions in the DM derived mode are the difference value and K2 respectively.

For example, when the DM is an angular mode, the minimum value of the index numbers of the prediction directions in the DM is 2 and the maximum value is 66. The DM derived mode is obtained by adding and subtracting N. It is assumed the present DM is an M angular mode ($2 \leq M \leq 66$). (Here, like addition and subtraction of N in an angular mode in luma intra prediction candidates).

When $M+N \leq 66$ and $M-N \geq 2$, the DM derived mode is M+N and M−N.

When $M+N \geq 66$, the DM derived mode is M−N and 66.

When $M-N \leq 2$, the DM derived mode is 2 and M+N.

For example, the DM is 40 and an offset N is 5. In such a case, the DM derived mode is 35 and 45. When the DM is 62, the derived mode is 57 and 2 (62+5=67, 67 exceeds the range [2, 66] and may be limited to 66).

Figure 11:
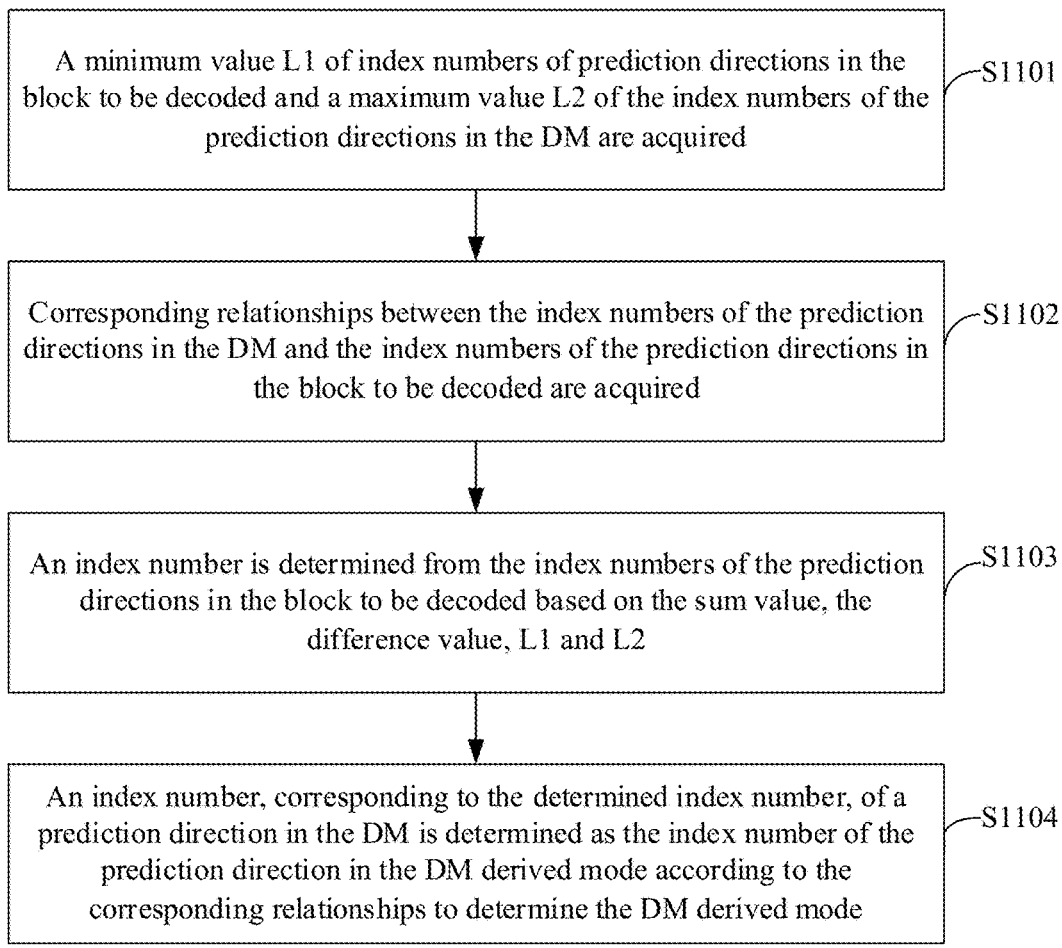
FIG. 11 is a flowchart of another method for determining a prediction direction according to an embodiment of the disclosure.

For determining AN index number of A prediction direction in the DM derived mode, in an optional embodiment, when the index numbers of the prediction directions in the DM are different from the index numbers of the prediction directions in the block to be decoded, correspondingly, FIG. 11 is a flowchart of another method for determining a prediction direction according to an embodiment of the disclosure. As shown in FIG. 11, S102 may include the following operations.

In S1101, a minimum value L1 of index numbers of prediction directions in the block to be decoded and a maximum value L2 of the index numbers of the prediction directions in the DM are acquired.

In S1102, corresponding relationships between the index numbers of the prediction directions in the DM and the index numbers of the prediction directions in the block to be decoded are acquired.

In S1103, an index number is determined from the index numbers of the prediction directions in the block to be decoded based on the sum value, the difference value, L1 and L2.

In S1104, an index number, corresponding to the determined index number, of a prediction direction in the DM is determined as the index number of the prediction direction in the DM derived mode according to the corresponding relationships to determine the DM derived mode.

Specifically, when the block to be decoded is a rectangle, the prediction directions represented by the index numbers in the block to be decoded are different from but have corresponding relationships with the prediction directions represented by the index numbers in the DM. For example, when the block to be decoded is a rectangle, the prediction directions in the block to be decoded may be rotated clockwise or counterclockwise by certain degrees relative to the prediction directions in the DM. The index numbers of different prediction directions may correspond to each other, and the finally obtained index numbers of the prediction directions in the DM derived mode are within the range of the index numbers of the prediction directions in the DM.

For determining an index number from the index numbers of the prediction directions in the block to be decoded, in an optional embodiment, S1103 may include the following operations.

When the sum value is smaller than or equal to L2 and the difference value is larger than or equal to L1, it may be determined that the determined index numbers are the sum value and the difference value respectively.

When the difference value is smaller than or equal to L1, it may be determined that the determined index numbers are the sum value and a third output value respectively, the third output value being a value obtained by inputting M and N to a third preset formula.

When the sum value is larger than or equal to L2, it may be determined that the determined index numbers are a fourth output value and the difference value respectively, the fourth output value being a value obtained by inputting M and N to a fourth preset formula.

The third preset formula and the fourth preset formula may be obtained according to L1 and L2, and the variables M and N are preset.

For example, when the DM is an angular mode, the DM derived mode may be obtained by adding and subtracting N. When the present DM is an M angular mode ($2 \leq M \leq 66$), it can be seen from a corresponding relationship in a wide-angle mode that a real effective range (equivalent to the index numbers of the prediction directions in the block to be decoded) is ($8 \leq M \leq 72$). For example, for a wide-angle mode with a width-height ratio being 2, a corresponding relationship is shown in Table 4.

TABLE 4

| Mode number | 2 | 3 | 4 | 5 | 6 | 7 |
|---|---|---|---|---|---|---|
| Real mode | 67 | 68 | 69 | 70 | 71 | 72 |

A process for the DM derived mode is as follows.

When M+N≤72 and M−N≥8, the DM derived mode is M+N and M−N.

When M−N≤8, the DM derived mode is M+N and ((M+56−N) % 64)+8.

When M+N≥72, the DM derived mode is ((M−8+N) % 64)+8 and M−N.

When an obtained result is 67 to 72, the result may be mapped to 2 to 66 according to the correspondences in Table 4.

For determining an index number from the index numbers of the prediction directions in the block to be decoded, in an optional embodiment, S1103 may include the following operations.

When the sum value is smaller than or equal to L2 and the difference value is larger than or equal to L1, it may be determined that the determined index numbers are the sum value and the difference value respectively.

When the difference value is smaller than or equal to L1, it may be determined that the determined index numbers are the sum value and L1 respectively.

When the sum value is larger than or equal to L2, it may be determined that the determined index numbers are the difference value and L2 respectively.

For example, column addition to the DM derived mode is proposed in the art, and a specific derivation method in a wide-angle mode is as follows.

When the DM is an angular mode, the DM derived mode may be obtained by adding and subtracting N. When the present DM is an M angle mode ($2 \leq M \leq 66$), it can be seen from a corresponding relationship in a wide-angle mode that a real effective range is ($8 \leq M \leq 72$), a corresponding manner being shown in Table 4. The process for the DM derived mode is as follows.

When M+N≤72 and M−N≥8, the DM derived mode is M+N and M−N.

When M−N≤8, the DM derived mode is M+N and 8.

When M+N≥72, the DM derived mode is 72 and M−N.

When the obtained result is 67 to 72, the result may be mapped to 2 to 66 according to the correspondences in Table 1.

In an optional implementation, after S102, the method may further include the following operation.

It may be determined that a decoding priority of the DM derived mode is lower than a decoding priority of the DM and lower than a decoding priority of a CCLM mode.

That is, the DM derived mode may be set after the DM and the CCLM mode are set. In such a manner, in a decoding process, the higher the priority is, the lower a received bit rate is.

In an optional implementation, after S102, the method may further include the following operation.

It may be determined that the decoding priority of the DM derived mode is lower than the decoding priority of the DM, lower than the decoding priority of the CCLM mode, higher than a decoding priority of a VER mode and higher than a decoding priority of a HOR mode.

When the DM is an angular mode, a construction method for a chroma intra prediction direction in the example is shown in Table 5.

TABLE 5

| Sequence number | Name | Description |
|---|---|---|
| 1 | DM | See the prediction mode corresponding to the central luma block in FIG. 5 |
| 2 | CCLM CCLM_L CCLM_T | A predicted signal is constructed based on a solution of a*luma value + b, and a and b are calculated in CCLM based on the top row and the left column<br>a and b are calculated in CCLM_L based on the left column<br>a and b are calculated in CCLM_T based on the top row |
| 3 | DM + N | Offsetting the direction in the DM clockwise by N |
| 4 | DM − N | Offsetting the direction in the DM counter-clockwise by N |
| 5 | DC | The index number of the intra direction in FIG. 3A is 1, and when the DM is the DC mode, the index number is changed to 66 |
| 6 | PLANAR | The index number of the intra direction in FIG. 3A is 0, and when the DM is the PLANAR mode, the index number is changed to 66 |
| 7 | VER | The index number of the intra direction in FIG. |

TABLE 5-continued

| Sequence number | Name | Description |
|---|---|---|
| | | 3A is 50, and when the DM is the VER mode, the index number is changed to 66 |
| 8 | HOR | The index number of the intra direction in FIG. 3A is 18, and when the DM is the HOR mode, the index number is changed to 66 |

In an optional implementation, after S102, the method may further include the following operation.

It may be determined that the decoding priority of the DM derived mode is lower than the decoding priority of the DM, lower than the decoding priority of the CCLM mode, lower than a decoding priority of a DC mode and lower than a decoding priority of a PLANAR mode.

When the DM is an angular mode, a construction method for a chroma intra prediction direction in the example is shown in Table 6.

TABLE 6

| Sequence number | Name | Description |
|---|---|---|
| 1 | DM | See the prediction mode corresponding to the central luma block in FIG. 5 |
| 2 | CCLM CCLM_L CCLM_T | A predicted signal is constructed based on a solution of a*luma value + b, and a and b are calculated in CCLM based on the top row and the left column<br>a and b are calculated in CCLM_L based on the left column<br>a and b are calculated in CCLM_T based on the top row |
| 3 | DC | The index number of the intra direction in FIG. 3A is 1, and when the DM is the DC mode, the index number is changed to 66 |
| 4 | PLANAR | The index number of the intra direction in FIG. 3A is 0, and when the DM is the PLANAR mode, the index number is changed to 66 |
| 5 | DM + N | Offsetting the direction in the DM clockwise by N |
| 6 | DM − N | Offsetting the direction in the DM counter-clockwise by N |

In an optional implementation, after S102, the method may further include the following operation.

It may be determined that the decoding priority of the DM derived mode is lower than the decoding priority of the DM, lower than the decoding priority of the CCLM mode, lower than the decoding priority of the DC mode, lower than the decoding priority of the PLANAR mode, higher than the decoding priority of the VER mode and higher than the decoding priority of the HOR mode.

When the DM is an angular mode, a construction method for a chroma intra prediction direction in the example is shown in Table 7.

TABLE 7

| Sequence number | Name | Description |
|---|---|---|
| 1 | DM | See the prediction mode corresponding to the central luma block in FIG. 5 |
| 2 | CCLM CCLM_L CCLM_T | A predicted signal is constructed based on a solution of a*luma value + b, and a and b are calculated in CCLM based on the top row and the left column<br>a and b are calculated in CCLM_L based on the left column |

TABLE 7-continued

| Sequence number | Name | Description |
|---|---|---|
| | | a and b are calculated in CCLM_T based on the top row |
| 3 | DC | The index number of the intra direction in FIG. 3A is 1, and when the DM is the DC mode, the index number is changed to 66 |
| 4 | PLANAR | The index number of the intra direction in FIG. 3A is 0, and when the DM is the PLANAR mode, the index number is changed to 66 |
| 5 | DM + N | Offsetting the direction in the DM clockwise by N |
| 6 | DM − N | Offsetting the direction in the DM counter-clockwise by N |
| 7 | VER | The index number of the intra direction in FIG. 3A is 50, and when the DM is the VER mode, the index number is changed to 66 |
| 8 | HOR | The index number of the intra direction in FIG. 3A is 18, and when the DM is the HOR mode, the index number is changed to 66 |

Optionally, according to the embodiment of the disclosure, the determined DM derived mode may be extended prior to the fixed HOR, VER and 66 modes according to the DM based on a construction method for a chroma intra prediction direction in 2.2.1 VVC to improve the quality of a candidate prediction direction, and the DM derived mode is set after the CCLM mode and before other angular modes are set.

The embodiment of the disclosure provides a method for determining a prediction direction. The method is implemented by a decoder. The method includes that: a DM in a chroma intra prediction mode of a block to be decoded is acquired, and an index number of a prediction direction in a DM derived mode is determined based on an index number M of a prediction direction in the DM and preset N to determine the DM derived mode. That is, in the embodiments of the disclosure, the index number of the prediction direction in the DM derived mode may be determined based on the acquired index number of the prediction direction in the DM in candidate modes of the chroma intra prediction mode and a value of N, thereby determining the DM derived mode as a candidate mode of the chroma intra prediction mode for intra prediction of a chroma block to be decoded. The DM derived mode may be added to the candidate modes of the chroma intra prediction mode for intra prediction of the block to be decoded, so that the decoding accuracy may be improved, and the transmission quality of video data may further be improved.

Figure 12:
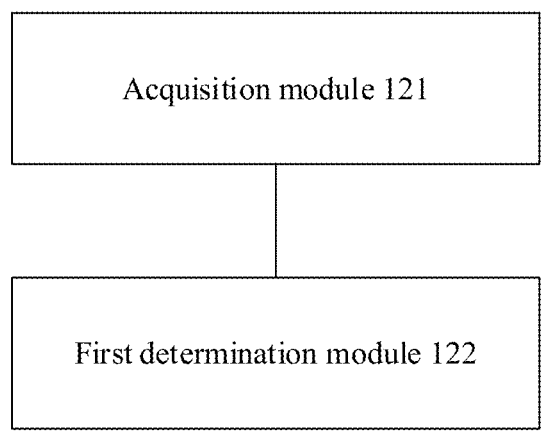
FIG. 12 is a first structure diagram of a decoder according to an embodiment of the disclosure.

Based on the same inventive concept of the abovementioned embodiment, referring to FIG. 12, FIG. 12 is a first structure diagram of a decoder according to an embodiment of the disclosure. The decoder may include an acquisition module 121 and a first determination module 122.

The acquisition module 121 is configured to acquire a DM in a chroma intra prediction mode of a block to be decoded. The first determination module 122 is configured to determine an index number of a prediction direction in a DM derived mode based on an offset N and an index number M of a prediction direction in the DM to determine the DM derived mode, N being a positive integer larger than or equal to 2 and M being a positive integer.

In the solution, the first determination module 122 may include a calculation submodule, a first acquisition submodule and a first determination submodule.

The calculation submodule is configured to sum M and N to obtain a sum value and calculate a difference value between M and N.

The first acquisition submodule is configured to acquire a minimum value K1 of index numbers of prediction directions in the DM and a maximum value K2 of the index numbers of the prediction directions in the DM.

The first determination submodule is configured to determine the index number of the prediction direction in the DM derived mode based on the sum value, the difference value, K1 and K2 to determine the DM derived mode.

In the solution, the first determination submodule is configured to:
when the sum value is smaller than or equal to K2 and the difference value is larger than or equal to K1, determine that the index numbers of the prediction directions in the DM derived mode are the sum value and the difference value respectively;
when the difference value is smaller than or equal to K1, determine that the index numbers of the prediction directions in the DM derived mode are the sum value and a first output value respectively, the first output value being a value obtained by inputting M and N to a first preset formula; and
when the sum value is larger than or equal to K2, determine that the index numbers of the prediction directions in the DM derived mode are a second output value and the difference value respectively, the second output value being a value obtained by inputting M and N to a second preset formula.

In the solution, the first determination submodule is configured to:
when the sum value is smaller than or equal to K2 and the difference value is larger than or equal to K1, determine that the index numbers of the prediction directions in the DM derived mode are the sum value and the difference value respectively;
when the difference value is smaller than or equal to K1, determine that the index numbers of the prediction directions in the DM derived mode are the sum value and K1 respectively; and
when the sum value is larger than or equal to K2, determine that the index numbers of the prediction directions in the DM derived mode are the difference value and K2 respectively.

In the solution, when the index numbers of the prediction directions in the DM are different from index numbers of prediction directions in the block to be decoded, correspondingly, the first determination submodule may include a second acquisition submodule, a third acquisition submodule, a second determination submodule and a third determination submodule.

The second acquisition submodule is configured to acquire a minimum value L1 of index numbers of prediction directions in the block to be decoded and a maximum value L2 of the index numbers of the prediction directions in the DM.

The third acquisition submodule is configured to acquire corresponding relationships between the index numbers of the prediction directions in the DM and the index numbers of the prediction directions in the block to be decoded.

The second determination submodule is configured to determine an index number from the index numbers of the prediction directions in the block to be decoded based on the sum value, the difference value, L1 and L2.

The third determination submodule is configured to determine an index number, corresponding to the determined index number, of a prediction direction in the DM as the index number of the prediction direction in the DM derived mode according to the corresponding relationships to determine the DM derived mode.

In the solution, the second determination submodule is configured to:
when the sum value is smaller than or equal to L2 and the difference value is larger than or equal to L1, determine that the determined index numbers are the sum value and the difference value respectively;
when the difference value is smaller than or equal to L1, determine that the determined index numbers are the sum value and a third output value respectively, the third output value being a value obtained by inputting M and N to a third preset formula; and
when the sum value is larger than or equal to L2, determine that the determined index numbers are a fourth output value and the difference value respectively, the fourth output value being a value obtained by inputting M and N to a fourth preset formula.

In the solution, the second determination submodule is configured to:
when the sum value is smaller than or equal to L2 and the difference value is larger than or equal to L1, determine that the determined index numbers are the sum value and the difference value respectively;
when the difference value is smaller than or equal to L1, determine that the determined index numbers are the sum value and L1 respectively; and
when the sum value is larger than or equal to L2, determine that the determined index numbers are the difference value and L2 respectively.

In the solution, the decoder may further include a second determination module.

The second determination module is configured to, after the index number of the prediction direction in the DM derived mode is determined based on the preset offset N and the index number M of the prediction direction in the DM to determine the DM derived mode, determine that a decoding priority of the DM derived mode is lower than a priority of the DM and lower than a decoding priority of a CCLM mode.

In the solution, the second determination module is configured to:
determine that the decoding priority of the DM derived mode is lower than the decoding priority of the DM, lower than the decoding priority of the CCLM mode, higher than a decoding priority of a VER mode and higher than a decoding priority of a HOR mode.

In the solution, the second determination module is configured to:
determine that the decoding priority of the DM derived mode is lower than the decoding priority of the DM, lower than the decoding priority of the CCLM mode, lower than a decoding priority of a DC mode and lower than a decoding priority of a PLANAR mode.

In the solution, the second determination module is configured to:
determine that the decoding priority of the DM derived mode is lower than the decoding priority of the DM, lower than the decoding priority of the CCLM mode, lower than the decoding priority of the DC mode, lower than the decoding priority of the PLANAR mode, higher than the decoding priority of the VER mode and higher than the decoding priority of the HOR mode.

It can be understood that, in the embodiment, "unit" may be part of a circuit, part of a processor, part of a program or software and the like, and may also be modular or non-modular.

In addition, each unit in the embodiment may be integrated into a processing unit, or each unit may also exist independently. Two or more than two units may also be integrated into a unit. The integrated unit may be implemented in a hardware form or may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a Read Only Memory (ROM), a Random Access Memory (RAM), a magnetic disk or an optical disk.

Figure 13:
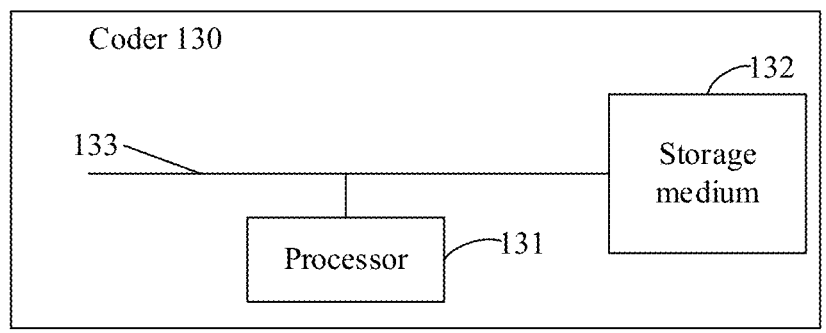
FIG. 13 is a second structure diagram of a decoder according to an embodiment of the disclosure.

FIG. 13 is a second structure diagram of a decoder according to an embodiment of the disclosure. As shown in FIG. 13, the embodiment of the disclosure provides a decoder 130.

The decoder includes a processor 131 and a storage medium 132 storing instructions executable by the processor 131. The storage medium 132 may communicate with the processor 131 through a communication bus 133 to execute an operation. The instructions may be executed by the processor 131 to implement the method for determining a prediction direction in embodiment 1.

It is to be noted that, during a practical application, components in a terminal may be coupled together through the communication bus 133. It can be understood that the communication bus 133 is configured to implement connection communication between these components. The communication bus 133 may include a data bus and further include a power bus, a control bus and a state signal bus. However, for clear description, various buses in FIG. 13 are marked as the communication bus 133.

The embodiments of the disclosure provide a computer storage medium, which stores executable instructions. The readable instructions may be executed by one or more processors to enable the one or more processor to implement the method for determining a prediction direction in one or more abovementioned embodiments.

It can be understood that the memory in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the memory of a system and method described in the disclosure is intended to include, but not limited to, memories of these and any other proper types.

The processor may be an integrated circuit chip with a signal processing capability. In an implementation, each operation of the method may be completed by an integrated logic circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or any conventional processor and the like. The operations of the method in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium may be located in a memory, and the processor may read information in the memory and complete the operations of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), Programmable Logic Devices (PLDs), FPGAs, universal processors, controllers, microcontrollers, microprocessors, other electronic units configured to execute the functions in the disclosure or combinations thereof.

In case of implementation with software, the technology of the disclosure may be implemented through the modules (for example, processes and functions) implementing the functions in the disclosure. A software code may be stored in the memory and executed by the processor. The memory may be implemented in the processor or outside the processor.

It is to be noted that terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the disclosure are adopted not to represent superiority-inferiority of the embodiments but only for description.

From the above descriptions about the implementations, those skilled in the art may clearly know that the method of the abovementioned embodiments may be implemented in a manner of combining software and a necessary universal hardware platform, and may also be implemented through hardware, but the former is a preferred implementation under many circumstances. Based on such an understanding, the technical solutions of the disclosure substantially or parts making contributions to the conventional art may be embodied in form of software product, and the computer software product is stored in a storage medium (for example, a ROM/RAM, a magnetic disk and an optical disk), including a plurality of instructions configured to enable a computer (which may be a personal computer, a server, a network device or the like) to execute the method in each embodiment of the disclosure.

The embodiments of the disclosure are described above in combination with the drawings, but the disclosure is not limited to the abovementioned specific implementations. The abovementioned specific implementations are not restrictive but only schematic, those of ordinary skill in the art may be inspired by the disclosure to implement many forms without departing from the purpose of the disclosure and the scope of protection of the claims, and all these shall fall within the scope of protection of the disclosure.

INDUSTRIAL APPLICABILITY

In the embodiments of the disclosure, the embodiments of the disclosure provide a method for determining a prediction direction, a decoder and a computer storage medium. The method may be implemented by the decoder. The method includes that: a DM in a chroma intra prediction mode of a block to be decoded is acquired, and an index number of a prediction direction in a DM derived mode is determined based on an index number M of a prediction direction in the DM and preset N to determine the DM derived mode. That is, in the embodiments of the disclosure, the index number of the prediction direction in the DM derived mode may be determined based on the acquired index number of the prediction direction in the DM in candidate modes of the chroma intra prediction mode and a value of N, thereby determining the DM derived mode as a candidate mode of the chroma intra prediction mode for intra prediction of a chroma block to be decoded. The DM derived mode may be added to the candidate modes of the chroma intra prediction mode for intra prediction of the block to be decoded, so that the decoding accuracy may be improved, and the transmission quality of video data may further be improved.

The invention claimed is:

1. A method for determining a prediction direction, implemented by a decoder and comprising:
   determining a chroma intra prediction mode of a block to be decoded;
   acquiring a Direct Mode (DM) in the chroma intra prediction mode; and
   determining an index number of the prediction direction in a DM derived mode based on M, N, K1 and K2 to determine the DM derived mode,
   wherein the N is an offset, the M is an index value of prediction direction of the DM, the K1 is a minimum value of index values of prediction directions in the DM and the K2 is a maximum value of the index values of the prediction directions in the DM, and
   wherein decoding of a Cross-Component Linear Model Prediction (CCLM) is prior to decoding of the DM derived mode.

2. A method for determining a prediction direction, implemented by an encoder and comprising:
   determining a chroma intra prediction mode of an encoding block;
   acquiring a Direct Mode (DM) in the chroma intra prediction mode; and
   determining an index number of the prediction direction in a DM derived mode based on M, N, K1 and K2 to determine the DM derived mode;
   wherein the N is an offset, the M is an index value of prediction direction of the DM, the K1 is a minimum value of index values of prediction directions in the DM and the K2 is a maximum value of the index values of the prediction directions in the DM, and
   wherein encoding of a Cross-Component Linear Model Prediction (CCLM) is decoded prior to encoding of the DM derived mode.

3. A decoder, comprising:
   a processor; and
   a storage medium storing instructions executable by the processor,
   wherein the storage medium is configured to communicate with the processor through a communication bus to execute an operation, and the instructions are executed by the processor to implement a method for determining a prediction direction, the method comprising:
   determining a chroma intra prediction mode of a block to be decoded;
   acquiring a Direct Mode (DM) in the chroma intra prediction mode; and
   determining an index number of the prediction direction in a DM derived mode based on M, N, K1 and K2 to determine the DM derived mode;
   wherein the N is an offset, the M is an index value of prediction direction of the DM, the K1 is a minimum value of index values of prediction directions in the DM and the K2 is a maximum value of the index values of the prediction directions in the DM, and
   wherein decoding of a Cross-Component Linear Model Prediction (CCLM) is decoded prior to decoding of the DM derived mode.

4. An encoder, comprising:
   a processor; and
   a storage medium storing instructions executable by the processor,
   wherein the storage medium is configured to communicate with the processor through a communication bus to execute an operation, and the instructions are executed by the processor to implement a method for determining a prediction direction, the method comprising:
   determining a chroma intra prediction mode of an encoding block;
   acquiring a Direct Mode (DM) in the chroma intra prediction mode; and
   determining an index number of the prediction direction in a DM derived mode based on M, N, K1 and K2 to determine the DM derived mode;
   wherein the N is an offset, the M is an index value of prediction direction of the DM, the K1 is a minimum value of index values of prediction directions in the DM and the K2 is a maximum value of the index values of the prediction directions in the DM, and
   wherein encoding of a Cross-Component Linear Model Prediction (CCLM) is decoded prior to encoding of the DM derived mode.

* * * * *